(12) United States Patent
Pluchon (10) Patent No.: US 12,540,659 B2
(45) Date of Patent: Feb. 3, 2026

(54) SCREW ACTUATORS

(71) Applicant: Ratier-Figeac SAS, Figeac (FR)

(72) Inventor: Etienne Pluchon, Montfaucon (FR)

(73) Assignee: RATIER-FIGEAC SAS, Figeac (FR)

( * ) Notice: Subject to any disclaimer, the term of this patent is extended or adjusted under 35 U.S.C. 154(b) by 101 days.

(21) Appl. No.: 18/351,662

(22) Filed: Jul. 13, 2023

(65) Prior Publication Data

US 2024/0035551 A1 Feb. 1, 2024

(30) Foreign Application Priority Data

Jul. 27, 2022 (EP) ..................................... 22306122

(51) Int. Cl.
*F16H 25/20* (2006.01)
*B64C 13/28* (2006.01)
*F16H 25/22* (2006.01)
*F16H 25/24* (2006.01)

(52) U.S. Cl.
CPC ....... *F16H 25/205* (2013.01); *F16H 25/2006* (2013.01); *F16H 25/2204* (2013.01); *F16H 25/2472* (2013.01); *B64C 13/28* (2013.01)

(58) Field of Classification Search
CPC ............... F16H 25/205; F16H 25/2006; F16H 25/2204; F16H 25/2472; B64C 13/28
See application file for complete search history.

(56) References Cited

U.S. PATENT DOCUMENTS

| 8,457,836 | B2 | 6/2013 | Balasu et al. |
| 8,714,479 | B1 | 5/2014 | Chapman |
| 10,871,214 | B2 | 12/2020 | Teyssier et al. |
| 10,933,978 | B2 | 3/2021 | Olson et al. |
| 2014/0190291 | A1 | 7/2014 | Medina |
| 2018/0045291 | A1* | 2/2018 | Teyssier .................. B64C 13/28 |
| 2020/0393027 | A1 | 12/2020 | Ricard et al. |

FOREIGN PATENT DOCUMENTS

| EP | 3072809 A1 | 9/2016 |
| EP | 3282146 A1 | 2/2018 |
| GB | 2378494 A * | 2/2003 ............... B64C 9/02 |

OTHER PUBLICATIONS

European Search Report for Application No. 22306122.7, mailed Jan. 18, 2023, 8 pages.

* cited by examiner

*Primary Examiner* — Terence Boes
(74) *Attorney, Agent, or Firm* — CANTOR COLBURN LLP (57) ABSTRACT

A screw actuator includes a primary ball nut, a secondary nut, and a ball screw. The primary ball nut and secondary nut are both in threaded engagement with the ball screw, in which the inner functional plays of the screw actuator are configured such that in normal operation the threads of the secondary nut are in contact with the ball screw threads.

16 Claims, 4 Drawing Sheets

SCREW ACTUATORS

CROSS REFERENCE TO RELATED APPLICATION

This application claims priority to European Patent Application No. 22306122.7 filed Jul. 27, 2022, the entire contents of which is incorporated herein by reference.

TECHNICAL FIELD

This disclosure relates to screw actuators, in particular to screw actuators for use in safety critical roles in vehicles, for example in horizontal stabilizer trim actuators (HSTAs) for use in aircraft.

BACKGROUND

A typical screw actuator comprises a screw shaft having a screw thread, and one or more nuts disposed on the screw shaft. Each nut is substantially prevented from rotating (for example by connection to an element of the vehicle in which the screw actuator is located, for example an aircraft flap) so that, when the screw shaft is rotated about its axis, the nut is forced to move along the axis of the screw shaft by the interaction of the two threads.

A ballscrew actuator is a form of screw actuator, where ball bearings are located between a thread of the nut and the thread of the screw shaft. These ball bearings help to reduce friction between the nut thread and the screw thread, and reduce wear on the threads.

Wear occurs between the nut and screw thread (or between ball bearings and screw thread) and can result in catastrophic failure where the nut will be able to slip along the axis of the screw shaft substantially independently of rotation of the screw shaft. It is therefore desirable to inspect the actuator from time to time to investigate the wear. The screw thread of the screw shaft is generally accessible and can be inspected easily. However, the thread on the nut may require the disassembly of the screw actuator to allow inspection to occur.

Screw actuators for use in safety critical roles in vehicles are typically so configured that they include a primary load path and a secondary load path that is used if the primary load path fails. Examples of failure in the primary load path are failure of a ball nut, gimbal or crankpin.

For example, but without limitation, screw actuators may be used to move the slats and flaps of aircraft. A representative example is the use in connection with HSTAs which control a horizontal trimmable stabilizer surface on an aircraft, and are used to adjust the angle of the airfoil surface on the aircraft. Due to the size and importance of the horizontal stabilizer surface to the control of an aircraft in flight, a failure of the HSTA is potentially catastrophic for the aircraft. Because of this importance, HSTAs commonly have a primary load path through which the loading associated with the HSTA and horizontal stabilizer surface generally passes, and a separate secondary load path which generally does not carry any loading but which will take the loading associated with the HSTA and horizontal stabilizer surface in the event that the primary load path fails.

In such applications, a drive motor mounted on the aircraft is operated to selectively rotate a ball screw in an appropriate rotational direction, and a ball nut is mounted on/threaded on the ball screw and arranged to directly or indirectly engage the airfoil surface at an eccentric location relative to the pivot about which the stabilizer surface rotates. Thus, the motor may selectively rotate the ball screw relative to the ball nut in one rotational direction to cause the airfoil surface to move or pivot in one direction. The motor may selectively rotate the ball screw in an opposite rotational direction relative to the ball nut to cause the airfoil surface to move or pivot in an opposite direction. The ball screw may be rotated relative to the ball nut, or the ball nut may be rotated relative to the ball screw, as desired.

It is known, for instance from US 20180045291 A1, to provide a secondary nut, adjacent the first nut, as a backup nut. The secondary nut will take the load if the primary nut fails.

Figure 1:
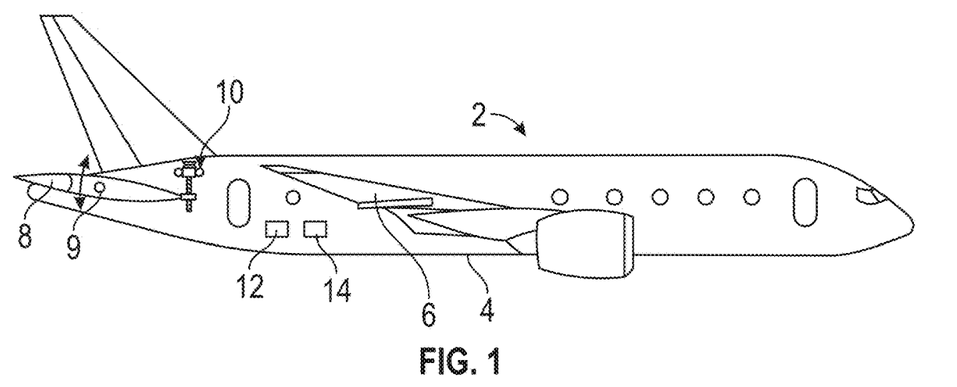
FIG. 1 shows a schematic view of an embodiment of an aircraft including an embodiment of a horizontal stabilizer trim actuator comprising a screw actuator according to the present disclosure.

In such systems, a shear pin or preloaded index device is used, as part of a claw coupling as shown in FIG. 1, to secure the primary nut to the secondary nut in normal operation when load is still being carried by a primary load path. The shear pin breaks when excessive shear is encountered, or the preloaded index device disengages, at which point a secondary load path using the secondary nut takes over.

The nut arrangement of the prior art may also have a formation in the primary nut engaged with a formation on the secondary nut, e.g. a protrusion on the secondary nut which projects through a recess in the primary nut or a transfer plate connected to the primary nut, in order to transfer the load from the primary nut and the primary load path to the secondary load path if the shear pin or preloaded index device fails.

In the prior art, the screw actuator is therefore configured such that in normal operation, the weight of the secondary nut is carried by the shear pin or by the preloaded index device and thereby transmitted to the primary nut. A functional play ensures that no contact occurs between the secondary nut and the screw thread in normal operation.

The present disclosure will be described and explained with reference to HSTAs below. It is to be understood, however, that the screw actuators of the present disclosure may be used in other safety critical roles and the present disclosure is not limited to HSTAs.

SUMMARY

According to a first aspect of the present disclosure there is provided a screw actuator comprising a primary ball nut, a secondary nut, and a ball screw. The ball screw has a longitudinal axis A. The primary ball nut and secondary nut are both in threaded engagement with the ball screw. The inner functional plays of the screw actuator are configured such that in normal operation the threads of the secondary nut are in contact with the ball screw threads.

Inner functional play is the relative motion allowed between distinct functional parts of the screw actuator. Inner functional plays are defined to allow the proper operation of the screw actuator. In particular, inner functional axial play between a nut and the screw is the axial movement of the nut that is possible without rotating the nut relative to the screw on which it is threaded because of gaps between the thread of the screw and the thread of the nut.

In the present disclosure, the functional axial play between the secondary nut and the screw is reduced in such a way that, contrary to the prior art, there is contact between the secondary nut and the screw in normal operation.

Normal operation relates to an operating condition in which the primary nut and associated supporting parts are functional and transmitting external loads (for instance loads originating from the horizontal stabilizer surface) to the screw, whereas the secondary nut is unloaded.

The screw actuator is configured such that each of the primary and secondary nut is prevented from rotating when the screw rotates. There is therefore friction between the secondary nut and the screw when the screw rotates in normal operation In an embodiment of the above embodiment, one of the primary ball nut and secondary nut may comprise an anti-rotation element extending from that nut, and the other of the primary ball nut and secondary nut comprises an anti-rotation element engaging means. The anti-rotation element and the anti-rotation element engaging means are configured to prevent relative rotation of the primary ball nut and secondary nut, and the engagement between the anti-rotation element and anti-rotation element engaging means allows relative movement between the primary ball nut and secondary nut in an axial direction, and transmission of rotational movement around the axis A between the primary ball nut and secondary nut.

In an alternative embodiment of the above embodiment, the secondary nut may comprise an anti-rotation element extending from that nut, and a non-rotating part of the screw actuator comprises an anti-rotation element engaging means. The anti-rotation element and the anti-rotation element engaging means are configured to prevent relative rotation of the screw actuator and secondary nut, and the engagement between the anti-rotation element and anti-rotation element engaging means allows relative movement between the screw actuator and secondary nut in an axial direction, and prevention of relative rotational movement around the axis A between the screw actuator and secondary nut.

An advantage of the screw actuator of the present disclosure is that because there is no fixed link between the primary ball nut and secondary nut, the secondary nut can disengage from the primary ball nut without the need for a load or force between the nuts to disengage the nuts from each other. This is advantageous because it means that the secondary nut will take the load from the failed primary ball nut faster than known primary ball nut and secondary nut systems.

In an embodiment of any of the above embodiments, the anti-rotation element is a longitudinally extending element which has parallel sides and a rectangular cross-section in a direction perpendicular to the longitudinal axis A. Two opposing sides of the longitudinally extending element are circumferentially spaced from each other about the axis A and the element engaging means abuts those two opposing edges.

In an alternative embodiment of any of the above embodiments, the anti-rotation element is a longitudinally extending element, and the longitudinally extending element is cylindrical and extends in a direction parallel to the longitudinal axis A. The anti-rotation element engaging means in this embodiment at least partially surrounds at least part of the longitudinal extent of the longitudinally extending element. In some embodiments the element engaging means wholly surrounds at least part of the longitudinal extent of the longitudinally extending element.

In an alternative embodiment of any of the above embodiments, the anti-rotation element is one half of a splined connection and the anti-rotation element engaging means is the other half of the splined connection.

In an alternative embodiment of any of the above embodiments, the anti-rotation element is an indexing element, and the anti-rotation element engaging means is configured to engage with that indexing element.

In an embodiment of any of the above embodiments, the primary ball nut and secondary nut are longitudinally spaced from each other on the ball screw. The longitudinally extending element and element engaging means are so configured that longitudinal movement of one or both of the primary ball nut and secondary nut on the ball screw as a result of functional axial play between the ball screw and the primary ball nut and/or secondary nut does not cause the element engaging means and longitudinally extending element to disengage from each other.

In an embodiment of any of the above embodiments, the primary ball nut and secondary nut are longitudinally spaced from each other on the ball screw by a sufficient distance that the primary ball nut and secondary nut cannot contact each other than through the anti-rotation element and anti-rotation element engaging means. The engagement of the anti-rotation element and anti-rotation element engaging means results in relative rotation between the ball screw and the primary ball nut causing relative rotation between the ball screw and the secondary nut with the result that the primary ball nut and secondary nut maintain a constant distance from each other (other than any distance changes caused by axial play between the nuts and the ball screw) and the anti-rotation element engaging means and anti-rotation element remain engaged with each other. This prevents the primary ball nut and secondary nut locking each other on the ball shaft.

In an embodiment of any of the above embodiments, the secondary nut is in direct or indirect contact with the thread of the ball screw. Direct contact is when the thread of the secondary nut is touching the thread of the ball screw, and indirect contact is where there are one or more intermediate elements between the treads of the secondary nut and ball screw. Direct or indirect contact of the secondary nut with the ball screw is associated to a limited functional axial play between the secondary nut and the screw, i.e. around or less than 0.2 mm. The direct or indirect contact between the thread of the secondary nut and the thread of the ball screw has the effect that if the external load on the actuator transfers from the primary ball nut to the secondary nut as a result of failure the transfer of the load is smooth and no shock loading is experienced by the secondary nut or the ball screw. This is in contrast to known screw actuators with a primary and secondary nut where the secondary nut is not in contact with the thread in normal operation and as such there is a sudden movement of the thread of the secondary nut into contact with the screw thread if the load is transferred onto the secondary nut.

In an embodiment of any of the above embodiments, the secondary nut comprises a thread centering device. This has the function of positioning the thread of the secondary nut to sit in the center of the space defined by the thread of the ball screw. The thread centering device may sit between the thread of the secondary nut and the thread of the ball screw. The centering device may result in there being little or no functional axial play between the ball screw and the secondary nut. The centering device may be an integral part of the secondary nut or a separate element joined to or supported on the secondary nut.

In an embodiment of any of the above embodiments, the thread centering device comprises one or more threaded pads which are fitted to the secondary nut or directly onto at least some of the secondary nut threads.

In an embodiment of any of the above embodiments, the secondary nut threads comprise a dedicated coating or solid lubricant. The secondary nut coated threads/threaded pads are sized to support the weight of the secondary nut for the design life of the horizontal stabilizer trim actuator of the present disclosure.

In an embodiment of any of the above embodiments, the ball nut centering device is configured to at least partially seal the space between the ball screw and the secondary nut. Such sealing may assist in retaining lubricant on the portion of the ball screw thread between the primary ball nut and secondary nut In an embodiment of any of the above embodiments, the secondary nut has a male thread configured to correspond to the thread on the ball screw. The purpose of the secondary nut is to maintain the functionality of the screw actuator of the present disclosure if the engagement between the ball screw and the primary ball nut fails. As such, the secondary nut having a male thread configured to correspond to the thread on the ball screw rather than being a ball nut is sufficient for the continued functioning of the screw actuator until the ball screw and/or the primary ball nut are replaced or repaired.

In an embodiment of any of the above embodiments, the anti-rotation element extends from the primary ball nut.

In an embodiment of any of the above embodiments, one of the primary ball nut and secondary nut comprises two or more anti-rotation elements extending from an axial end of that nut, and the other of the primary ball nut and secondary nut comprises at least the same number of anti-rotation element engaging means as there are anti-rotation elements.

In an embodiment of any of the above embodiments, the screw actuator further comprises a distance monitoring means. The distance monitoring means monitors the distance between a location on or associated with the primary ball nut and a location on or associated with the secondary nut. In an embodiment of any of the above embodiments, the locations associated with the primary ball nut and secondary nut may be on primary and secondary gimbals connected to the primary ball nut and secondary nut respectively.

The monitoring means may be connected to an alarm that will be triggered if the distance between the location on the primary ball nut and the location on the secondary nut changes beyond a predetermined amount. This is because such a change of distance may be expected to reflect a failure of the engagement between the ball screw and the primary ball nut. In an embodiment of any of the above embodiments, the alarm may be activated by a signal sent from the monitoring means. That signal may be generated by electronics embedded in the screw actuator. The alarm signal may be sent, without limitation, to one or more of a flight control computer, a cockpit alarm or display, or a means for generating an alert for maintenance on ground. The alarm signal may sent through wires or electromagnetic signals, for example via a wireless signal.

A significant advantage of the screw actuator of the present disclosure is that a failure of the primary load path will be detected immediately, contrary to the prior art where load needs to be high enough to engage the secondary load path (for instance by rupture of a shear pin), and failure may remain hidden for more than one flight.

In an embodiment of any of the above embodiments, the screw actuator further comprises a primary load transmitting linkage and a secondary load transmitting linkage, and the screw actuator is so configured that an external load can be connected or transmitted to the primary ball nut by a first connection element and the load can be connected or transmitted to the secondary nut by a second connection element, the primary connection elements are configured to connect to the primary load transmitting linkage, the secondary connection elements are configured to connect to the secondary load transmitting linkage, and the primary and secondary load transmitting linkages are so configured that the load passes along the primary load transmitting linkage to the primary ball nut and the ball screw unless the threaded engagement between the primary ball nut and the ball screw fails, and the load passes along the secondary load transmitting linkage to the secondary nut and the ball screw when the threaded engagement between the primary ball nut and the ball screw fails.

In an embodiment of any of the above embodiments, the primary load transmitting linkage is a primary gimbal. The primary ball nut is connected to the primary gimbal, and the primary gimbal is adapted to engage with the external load. The engagement between the primary gimbal and the external load may be a direct engagement or via one or more intermediate elements. In some embodiments the load is a horizontal stabilizer surface.

In an embodiment of any of the above embodiments, the secondary load transmitting linkage is a secondary gimbal, the secondary nut is connected to the secondary gimbal, and the secondary gimbal is adapted to engage with the external load. In some embodiments that engagement includes connection of the primary gimbal to the secondary gimbal.

In an alternative embodiment of any of the above embodiments, the connection between the primary ball nut and the external load and/or the secondary nut and the external load may be along one or more alternative load transmitting elements.

In an embodiment of any of the above embodiments, any axial displacement between the secondary nut and the secondary gimbal is monitored by a monitoring means. The monitoring means may be connected to an alarm that will be triggered if the distance between the secondary nut and the secondary gimbal changes beyond a predetermined amount.

According to a second aspect of the present disclosure there is provided a horizontal stabilizer trim actuator configured to actuate at least one horizontal stabilizer surface, the horizontal stabilizer trim actuator comprising a screw actuator according to the first aspect of the present disclosure.

According to a third aspect of the present disclosure there is provided an aircraft comprising at least one horizontal stabilizer surface and at least one horizontal stabilizer trim actuator according to the second aspect of the present disclosure.

According to a fourth aspect of the present disclosure there is provided a method of actuating a horizontal stabilizer surface, in which the horizontal stabilizer surface is actuated by a horizontal stabilizer trim actuator, and the horizontal stabilizer trim actuator comprises a screw actuator comprising a primary ball nut, a secondary nut, and a ball screw. The inner functional plays of the screw actuator are configured such that in normal operation the threads of the secondary nut are in contact with the ball screw threads.

In an embodiment of the above embodiment, the ball screw has a longitudinal axis A, and the primary ball nut and secondary nut are both in threaded engagement with the ball screw. One of the primary ball nut and secondary nut comprises an anti-rotation element extending from that nut, and the other of the primary ball nut and secondary nut comprises an anti-rotation element engaging means. The anti-rotation element and the anti-rotation element engaging means are configured to prevent relative rotation of the primary ball nut and secondary nut. The engagement between the anti-rotation element and anti-rotation element engaging means allows relative movement between the primary ball nut and secondary nut in an axial direction, and transmission of rotational movement around the axis A between the primary ball nut and secondary nut.

BRIEF DESCRIPTION OF THE DRAWINGS

The present invention will be further described and explained by way of example with reference to the accompanying drawings in which.

DETAILED DESCRIPTION

With reference to FIG. 1, an aircraft 2 includes a body 4, wings 6 and a horizontal stabilizer surface 8 which is attached to the body 4 by a horizontal stabilizer surface hinge 9. Within the body 4 and extending between an anchor position (not shown) on the body 4 and a connection element (not shown) connected with the horizontal stabilizer surface 8 is a horizontal stabilizer trim actuator 10. The horizontal stabilizer trim actuator 10 is controlled by a controller 12 and powered by a power source 14.

Figure 2:
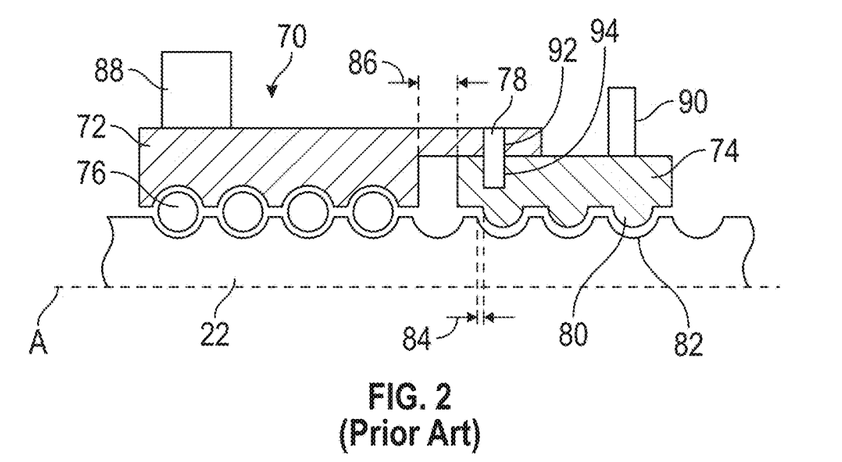
FIG. 2 shows a schematic partial sectional view of a first prior art screw actuator.

With reference to FIG. 2, a schematic partial sectional view of a prior art horizontal stabilizer trim actuator 70 is shown. The horizontal stabilizer trim actuator 70 comprises a primary ball nut 72 and a secondary nut 74. The primary ball nut 72 is engaged with a ball screw 22 via ball bearings 76 (for clarity only one ball bearing is labelled). The primary ball nut 72 is connected to the secondary nut 74 by a fuse pin 78 which is inserted into first and second bores 92, 94 in the primary ball nut 72 and the secondary nut 74 respectively. The connection of the primary ball nut 72 to the secondary nut 74 by the fuse pin 78 is, in normal operating conditions, a rigid connection.

The ball screw 22 has a central axis A. The primary ball nut 72 and the secondary nut 74 are so configured that the thread 80 of the secondary nut 74 is not in contact with the thread 82 of the ball screw 22. The functional free play between the threads 80, 82 of the secondary nut 74 and ball screw 22 is distance 84. The functional free play between the primary ball nut 72 and the secondary nut 74 is distance 86.

In normal operation an external load (not shown) is transmitted via a first load path (not shown) to connection elements 88 (only one shown), into the primary ball nut 72, and into the ball screw 22 via the ball bearings 76. A second load path (not shown) connects to the secondary nut 74 via connection elements 90. The first and second load paths are so configured that in normal operation no load is transmitted along the second load path. If there is a failure in the first load path, for example the thread 82 of the ball screw that is adjacent the primary ball nut 72 fails, then the fuse pin 78 will ultimately fail, this can take some time dependent on the forces to which it is exposed, and the external load will start to become transmitted via the second load path. This will cause the second nut 74 to move axially relative to the primary nut 72 and the thread 80 of the secondary nut 74 to engage with the thread 82 of the ball screw.

Figure 3:
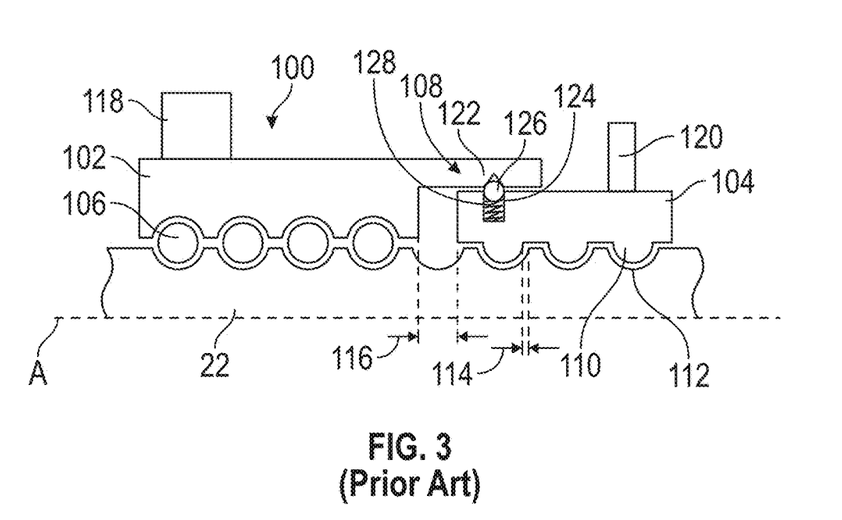
FIG. 3 shows a schematic partial sectional view of a second prior art screw actuator.

With reference to FIG. 3, a schematic partial sectional view of a prior art horizontal stabilizer trim actuator 100 is shown. The horizontal stabilizer trim actuator 100 comprises a primary ball nut 102 and a secondary nut 104. The primary ball nut 102 is engaged with a ball screw 22 via ball bearings 106 (for clarity only one ball bearing is labelled). The primary ball nut 102 is connected to the secondary nut 104 by a spring plunger 108. The spring plunger 108 is inserted into a second bore 124 in the secondary nut 104, and a spring 128 biases a plunger element 126 into a recess 122 in the primary ball nut 102. The connection of the primary ball nut 102 to the secondary nut 104 by the spring plunger 108 is, in normal operating conditions, a rigid connection.

The ball screw 22 has a central axis A. The primary ball nut 102 and the secondary nut 104 are so configured that the thread 110 of the secondary nut 104 is not in contact with the thread 112 of the ball screw 22. The functional free play between the threads 110, 112 of the secondary nut 104 and ball screw 22 is distance 114. The functional free play between the primary ball nut 102 and the secondary nut 104 is distance 116.

In normal operation an external load (not shown) is transmitted via a first load path (not shown) to connection elements 118 (only one shown), into the primary ball nut 102, and into the ball screw 22 via the ball bearings 106. A second load path (not shown) connects to the secondary nut 104 via connection elements 120. The first and second load paths are so configured that in normal operation no load is transmitted along the second load path. If there is a failure in the first load path, for example the thread 112 of the ball screw that is adjacent the primary ball nut 102 fails, then the spring plunger 108 will ultimately fail, this can take some time dependent on the forces to which it is exposed, and the external load will start to become transmitted via the second load path. This will cause the second nut 104 to move axially relative to the primary nut 102 and the thread 110 of the secondary nut 104 to engage with the thread 112 of the ball screw.

Figure 4:
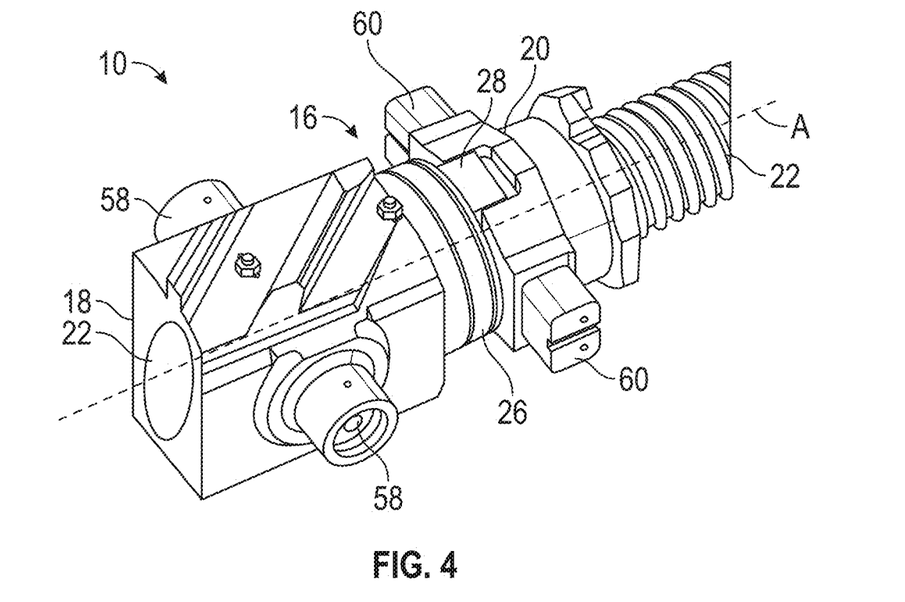
FIG. 4 shows a partial schematic perspective view of the screw actuator of FIG. 1.
Figure 5:
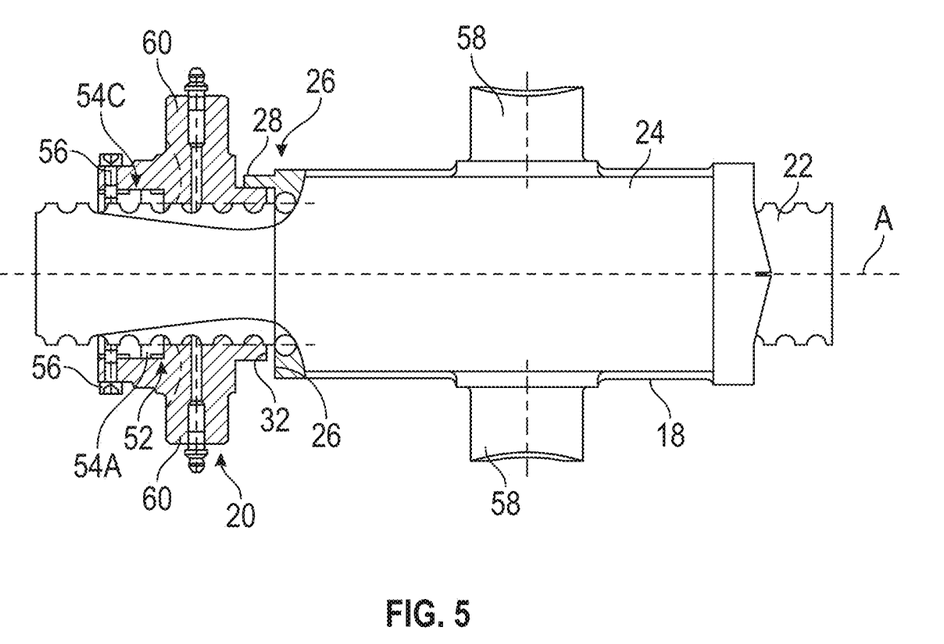
FIG. 5 shows a schematic side view of the screw actuator of FIG. 1 including partial cross-sections.
Figure 8:
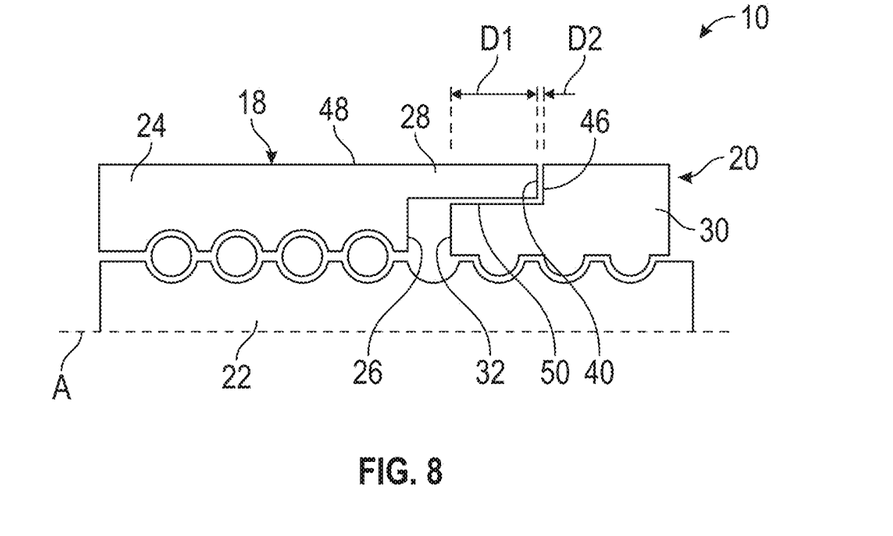
FIG. 8 shows a schematic sectional view of the screw actuator of FIG. 1.

With reference to FIGS. 4, 5 and 8, the horizontal stabilizer trim actuator 10 includes a screw actuator 16 according to the present disclosure. The screw actuator 16 includes a primary ball nut 18 and a secondary nut 20. Both of the primary ball nut and secondary nut 18, 20 are threaded onto a longitudinally extending ball screw 22. The ball screw 22 has a longitudinal axis A.

The body 24 of the primary ball nut 18 is longitudinally extending along the axis A between first axial end 26 and a second axial end. Extending from the body 24 at the intersection of the first axial end 26 and a longitudinally extending surface 48 of the body 24 is an anti-rotation element in the form of a longitudinally extending element 28.

Figure 6:
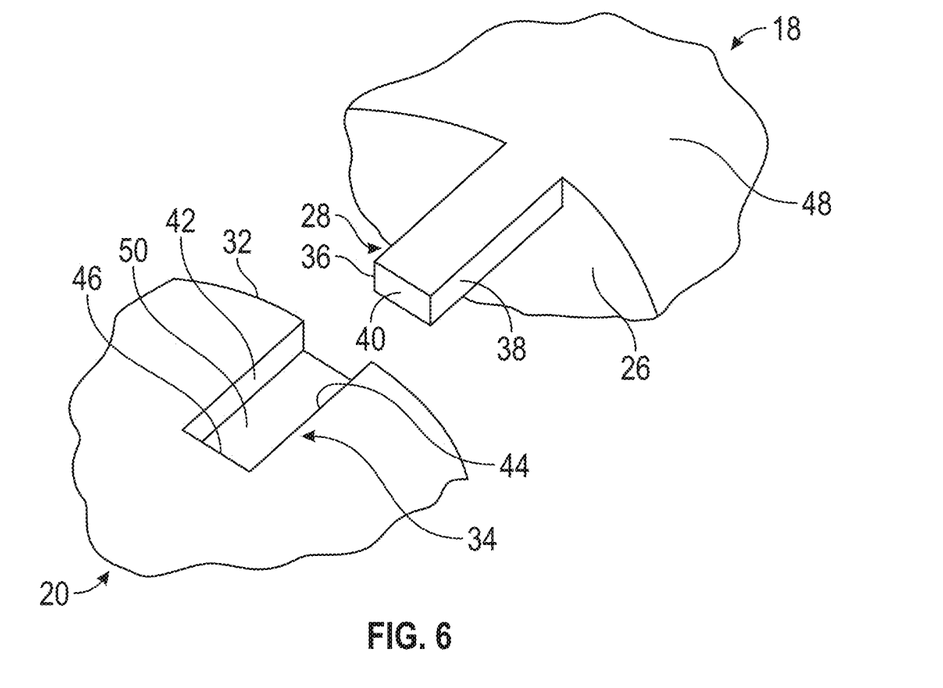
FIG. 6 shows a first enlarged view of part of the screw actuator of FIG. 1.
Figure 7:
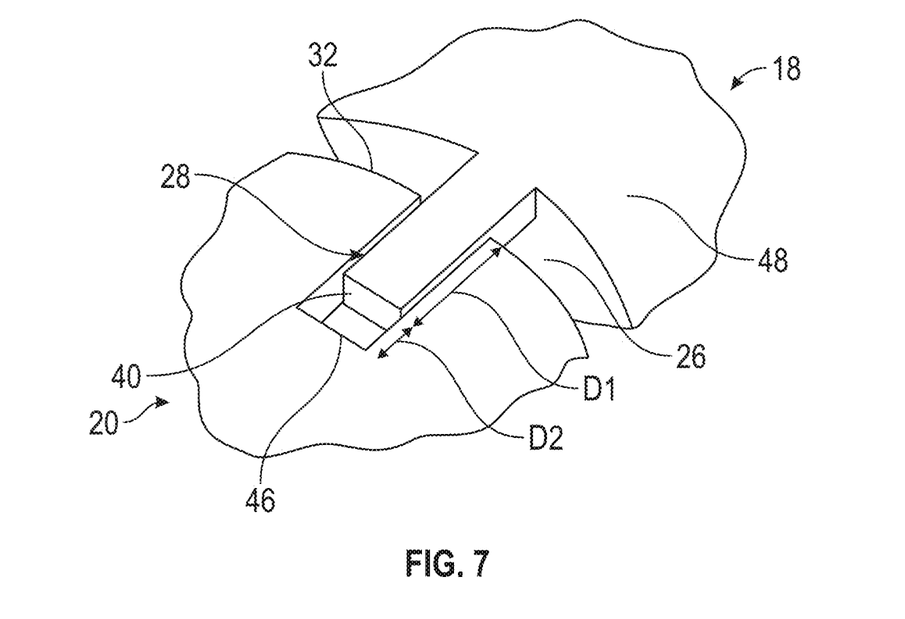
FIG. 7 shows a second enlarged view of part of the screw actuator of FIG. 1.

With reference to FIGS. 6 and 7 and with continued reference to FIGS. 4, 5 and 8, the longitudinally extending element 28 has a cross-section that is rectangular in a plane perpendicular to the axis A and first and second parallel longitudinally extending faces 36, 38 that are circumferentially or approximately circumferentially spaced from each other. The first and second parallel longitudinally extending faces 36, 38 extend between the first axial end 26 of the primary ball nut 18 and end face 40 of the longitudinally extending element 28 remote from the body 24 of the primary ball nut 18.

The secondary nut 20 has a male thread configured to correspond to the thread on the ball screw 22. The body 30 of the secondary nut 20 is longitudinally extending along the axis A between a first axial end 32 and a second axial end. Extending into the body 30 of the secondary nut 20 from the first axial end 32 is an anti-rotation element engaging means in the form of a recess 34. The recess 34 extends axially from the first axial end 32 and circumferentially or approximately circumferentially around a part of the nut 20. The recess 32 is defined by first and second parallel longitudinally extending faces 42, 44, a recess floor 50, and a recess end 46. The first and second longitudinally extending faces 42, 44 are parallel to each other and circumferentially or approximately circumferentially spaced from each other by a first distance which is greater than a second distance between the first and second parallel longitudinally extending faces 36, 38 of the longitudinally extending element 28. That first distance is the distance that allows the longitudinally extending element 28 to extend in an axial direction along the recess 34 with the first longitudinally extending faces 36, 42 in sliding or loose sliding contact with each other or closely adjacent to each other whilst the second longitudinally extending faces 38, 44 are in sliding or loose sliding contact with each other or closely adjacent to each other. This has the effect that the longitudinally extending element 28 may move along the recess 34 as a result of functional axial play between each of the primary ball nut and secondary nut 18, 20 and the ball screw 22. As a result, the primary ball nut 18 will not bear on the secondary nut 20 and force the threads of the secondary nut 20 against the threads of the ball screw 22 in normal operation, and very little or no force is required to cause the secondary nut 20 take up the load carried by the primary ball nut 18 if the engagement between the primary ball nut 18 and the ball screw 22 fails. The functional axial play is such that failure of the primary ball nut 18 can be detected by the monitoring means (discussed further below).

The primary ball nut and secondary nut 18, 20 are in threaded engagement with the longitudinally extending ball screw 22 and the first axial end 26 of the primary ball nut 18 is axially spaced from the first axial end 32 of the secondary nut 20. This ensures that the primary ball nut and secondary nut 18, 20 do not lock each other in position on the ball screw 22. The longitudinally extending element 28 extends into the recess 34 by a distance D1. This results in the end 40 of the longitudinally extending element 28 being spaced a distance D2 from the end 46 of the recess 34. The distances D1 and D2 may be different from each other, but both are greater than the maximum calculated functional axial play relative to the screw for the primary ball nut and secondary nut 18, 20 combined with to each other, which sum up in total to around 1 mm backlash. This has the effect that the longitudinally extending element 28 will not disengage from the recess 34 as a result of the functional axial play between each of the primary ball nut and secondary nut 18, 20 and the ball screw 22.

With reference to FIG. 5, the secondary nut 20 may include a nut centring device 52. The nut centring device 52 may have the form of four threaded pads 54A, 54B, 54C, 54D (only pads 54A and 54C are shown in FIG. 5) each of which is configured to be attached to the secondary nut 20 by an attachment means 56.

The threaded pads 54A, 54B, 54C, 54D are disposed circumferentially around and adjacent an end of a bore that extends at least partially through the secondary nut 20 and through which the ball screw 22 extends. The threaded pads 54A, 54B, 54C, 54D are configured to support the weight of the secondary nut 20 for the design life of the secondary nut 20 in normal operation.

The threaded pads 54A, 54B, 54C, 54D collectively form, in some embodiments (not shown), a substantially continuous ring around the ball screw 22 and partially or fully seal the gap between the secondary nut 20 and the ball screw 22.

The threaded pads 54A, 54B, 54C, 54D are formed from a low friction material, for example polytetrafluoroethylene (PTFE). In other embodiments alternative low friction materials or coatings known presently or developed in the future may be used. In other unillustrated embodiments the nut centring device may comprise a different number of pads or be formed from a single ring of low friction material.

In an alternative unillustrated embodiment, no separate centring device is included and the thread of the secondary nut is in contact with the thread of the ball screw.

In some alternative embodiments (not shown), no separate centring device is included and a coating is applied to the threads of the secondary nut 15 to centre the thread of the secondary nut 20 within the thread of the ball screw 22. The coating may be formed of a low friction material, PTFE, a material with similar properties to PFTE, or another solid lubricant. Again, the coated threads of the secondary nut 20 are configured to support the weight of the secondary nut 20 for the design life of the secondary nut 20 in normal operation.

The screw actuator 16 includes a distance monitoring means (not shown) which monitors the distance between a specific location on the primary ball nut 18 and a specific location on the secondary nut 20. The distance monitoring means feeds the results of its monitoring to the controller 12 by a suitable communication means (not shown).

In an alternative embodiment, the screw actuator 16 includes a distance monitoring means (not shown) which monitors the distance between a first part which is connected to the primary ball nut 18 with limited free play (+/−about 0.1 mm) between the first part and the primary ball nut 18 and a second part connected to the secondary nut 20 with limited free play (+/−about 0.1 mm) between the second part and the secondary nut 20. The distance monitoring means feeds the results of its monitoring to the controller 12 by a suitable communication means (not shown).

In both of these embodiments, the controller may be embedded in the screw actuator or may be located externally therefrom.

An external load, for example the load transmitted between the horizontal stabilizer surface 8 and the screw actuator 16, is transmitted in normal operation into or out of the primary ball nut 18 by a pair of primary connection elements 58 on the primary ball nut 18 when the primary ball nut 18 is in threaded engagement with the ball screw 22. When the primary ball nut 18 is not in threaded engagement with the ball screw 22 because that engagement has failed (for example because the primary ball nut, primary gimbal or another element of the primary load path has failed), the load is transmitted into or out of the secondary nut 20 by a pair of secondary connection elements 60 on the secondary nut. In an alternative embodiment, the primary connection elements and/or secondary connection elements may be a pair of trunnions.

Figure 9:
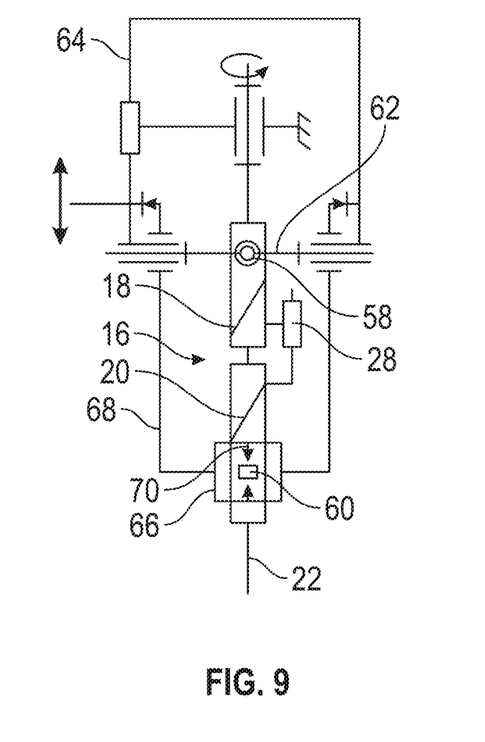
FIG. 9 shows a schematic view of an embodiment of a dual load path fully articulated attachment system which includes an embodiment of a screw actuator according to the present disclosure.

With reference to FIG. 9, FIG. 9 shows a schematic view of an embodiment of a dual load path fully articulated attachment system which includes a screw actuator 16. The primary connection elements 58 are connected to a primary load transmitting linkage in the form of a primary gimbal 62 and an external load is applied to a primary linkage 64. The secondary connection elements 60 are connected to a secondary load transmitting linkage in the form of a secondary gimbal 66 and a secondary linkage 68.

In normal operation, functional free play of the elements of a dual load path transmitting system should be configured such that there is no contact between the load and the secondary load path, and no contact between the primary load path and the secondary load path. For instance, free play between secondary gimbal and primary gimbal, and between secondary gimbal and primary linkage should be high enough (for example around 1 mm+/−0.5 mm) such that there is no contact therebetween. As an alternative or in addition, free play between secondary gimbal and secondary nut may be high enough (for example around 1 mm+/−0.5 mm) to prevent contact therebetween in operation.

The primary and secondary load transmitting linkages are so configured that the load passes along the primary load transmitting linkage to the primary ball nut 18 and to the ball screw in normal operation, and the load passes along the secondary load transmitting linkage to the secondary nut 20 and to the screw when one of the structural parts of the primary load path fails.

Axial displacement between the secondary nut 20 and the secondary gimbal 66 is monitored by a monitoring means 70.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the actuators disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A screw actuator comprising:
a primary ball nut;
a secondary nut; and
a ball screw;
wherein the actuator operates in a normal operating condition where the primary ball nut is loaded and the secondary nut is unloaded and a failure condition where the secondary nut is loaded;
wherein the primary ball nut and secondary nut are both in threaded engagement with the ball screw;
wherein inner functional plays of the screw actuator are configured such that in the normal operating condition the threads of the secondary nut are in contact with the ball screw.

2. A screw actuator according to claim 1, wherein:
one of the primary ball nut and secondary nut comprises an anti-rotation element extending from that nut;
an other of the primary ball nut and secondary nut comprises an anti-rotation element engaging means;
the anti-rotation element and the anti-rotation element engaging means are configured to prevent relative rotation of the primary ball nut and secondary nut; and
engagement between the anti-rotation element and anti-rotation element engaging means allows relative movement between the primary ball nut and secondary nut in an axial direction, and transmission of rotational movement around the longitudinal axis A of the ballscrew between the primary ball nut and secondary nut.

3. A screw actuator according to claim 2, wherein:
the primary ball nut and secondary nut are longitudinally spaced from each other on the ball screw; and
the anti-rotation element and anti-rotation element engaging means are so configured that longitudinal movement of one or both of the primary ball nut and secondary nut on the ball screw as a result of functional play between the ball screw and the primary ball nut and/or secondary nut does not cause the element engaging means and anti-rotation element to disengage from each other.

4. A screw actuator according to claim 1, wherein the secondary nut comprises a nut centering device.

5. A screw actuator according to claim 4, wherein the nut centering device comprises one or more threaded pads which are fitted to the secondary nut or directly onto at least some of the secondary nut threads.

6. A screw actuator according to claim 1, wherein the nut centering device is configured to at least partially seal the space between the ball screw and the secondary nut.

7. A screw actuator according to claim 1, wherein the secondary nut has a male thread configured to correspond to the thread on the ball screw.

8. A screw actuator according to claim 1, wherein the anti-rotation element extends from the primary ball nut.

9. A screw actuator according to claim 1, wherein:
one of the primary ball nut and secondary nut comprises two or more anti-rotation elements extending from an axial end of that nut; and
an other of the primary ball nut and secondary nut comprises at least the same number of anti-rotation element engaging means as there are anti-rotation elements.

10. A screw actuator according to claim 1, further comprising:
a distance monitoring means in which the distance monitoring means monitors the distance between a location on the primary ball nut and a location on the secondary nut.

11. A screw actuator according to claim 1, wherein:
the screw actuator further comprises: a primary load transmitting linkage and a secondary load transmitting linkage, and the screw actuator is so configured that an external load can be transmitted into or out of the primary ball nut by at least one primary connection element and the load can be transmitted into or out of the secondary nut by at least one secondary connection element;
the primary connection elements are configured to connect to the primary load transmitting linkage;
the secondary connection elements are configured to connect to the secondary load transmitting linkage;
the primary and secondary load transmitting linkages are so configured that the load passes along the primary load transmitting linkage to the primary ball nut and the ball screw in normal operation; and the load passes along the secondary load transmitting linkage to the secondary nut and the ball screw when one of the primary load transmitting linkage, primary connection element or primary ball nut fails.

12. A screw actuator according to claim 11, wherein the primary load transmitting linkage is a primary gimbal, the primary ball nut is connected to the primary gimbal, and the primary gimbal is adapted to engage with the external load.

13. A screw actuator according to claim 11, wherein the secondary load transmitting linkage is a secondary gimbal, the secondary nut is connected to the secondary gimbal, and the secondary gimbal is adapted to engage with the external load, and, optionally axial displacement between the secondary nut and the secondary gimbal is monitored by a monitoring means.

14. A horizontal stabilizer trim actuator configured to actuate at least one horizontal stabilizer surface, the horizontal stabilizer trim actuator comprising:

a screw actuator according to claim 1.

15. An aircraft comprising:

at least one horizontal stabilizer surface; and at least one horizontal stabilizer trim actuator as recited in claim 14 connected to at least one horizontal stabilizer surface.

16. A method of actuating a horizontal stabilizer surface, the method comprising:

moving the surface with a horizontal stabilizer trim actuator as recited in claim 14.

\* \* \* \* \*